United States Patent
Chen et al.

(10) Patent No.: US 7,684,286 B2
(45) Date of Patent: Mar. 23, 2010

(54) TRACK-JUMP CONTROL DEVICE AND METHOD THEREOF

(75) Inventors: Shu-Cing Chen, Bade (TW); Kuo-Jung Lan, Jhonghe (TW)

(73) Assignee: Mediatek Inc., Hsin-Chu (TW)

( * ) Notice: Subject to any disclaimer, the term of this patent is extended or adjusted under 35 U.S.C. 154(b) by 1239 days.

(21) Appl. No.: 11/216,917

(22) Filed: Aug. 31, 2005

(65) Prior Publication Data

US 2007/0047402 A1    Mar. 1, 2007

(51) Int. Cl.
G11B 21/08 (2006.01)
G11B 7/085 (2006.01)

(52) U.S. Cl. .................................. 369/30.13
(58) Field of Classification Search ............... 369/30.13
See application file for complete search history.

(56) References Cited

U.S. PATENT DOCUMENTS

| | | | |
|---|---|---|---|
| 6,222,798 B1 | 4/2001 | Kimura et al. | |
| 6,301,211 B1 * | 10/2001 | Ichikawa et al. | 369/47.27 |
| 6,314,066 B1 | 11/2001 | Hong et al. | 369/44.28 |
| 6,442,111 B1 | 8/2002 | Takahashi et al. | 369/44.28 |
| 6,574,175 B1 | 6/2003 | Yoon | |
| 6,628,575 B1 | 9/2003 | Ikeda et al. | 369/30.12 |
| 6,912,186 B2 * | 6/2005 | Yamanaka | 369/47.27 |
| 6,914,862 B2 * | 7/2005 | Tsai et al. | 369/47.41 |
| 7,218,579 B2 | 5/2007 | Lin et al. | |
| 7,280,447 B2 | 10/2007 | Lo | |
| 2004/0141429 A1 | 7/2004 | Kishimoto et al. | |
| 2005/0157603 A1 | 7/2005 | Tseng et al. | 369/30.14 |

FOREIGN PATENT DOCUMENTS

| | | |
|---|---|---|
| EP | 1267536 A1 | 12/2002 |
| GB | 2364865 A | 7/2000 |
| JP | 04339324 A | * 11/1992 |
| WO | WO9917492 | 4/1999 |

OTHER PUBLICATIONS

TW office action mailed Dec. 19, 2007.

* cited by examiner

*Primary Examiner*—Joseph H Feild
*Assistant Examiner*—Parul Gupta
(74) *Attorney, Agent, or Firm*—Thomas, Kayden, Horstemeyer & Risley

(57) ABSTRACT

The invention relates to a track-jump control device, and in particular, to a track-jump control device for determining track-jump timing in an optical disc drive. A track-jump control device of a PUH comprises an L/G position indicator, a header alignment controller, and a jump controller. The L/G position indicator calculates an amount of sectors between the current position and an upcoming L/G switch point to generate a distance value. The header alignment controller controls the destination position locating in a safe area between two headers, and then generating a jump enabling signal. The jump controller coupled to the L/G position indicator and the header alignment controller determines track-jump timing according to the distance value and the jump enabling signal.

32 Claims, 10 Drawing Sheets

TRACK-JUMP CONTROL DEVICE AND METHOD THEREOF

BACKGROUND

The invention relates to a track-jump control device, and in particular, to a track-jump control device for determining track-jump timing in an optical disc drive.

In recent years, there is a need to utilize high-capacity and re-writable recording medium (e.g. DVDRAM) to store all kinds of data. Take a DVDRAM as an example, it has pre-defined data (also called a header) at the beginning of each sector, for addressing, and to meet a need for random access. The addressing capability of a DVDRAM is similar to that of a hard disk. Since each sector has a predefined data for addressing, both lands and grooves in a DVDRAM must store user data to ensure that the total capacity of DVDRAM does not decrease. If the spot of the PUH suddenly encounters a polar transition in lands and grooves when track-jumping finishes, the read servo will fail easily, particularly at high-speed. Additionally, if the spot of the PUH encounters a header in a sector when a track-jump has finished and enters into the closed loop process, the read servo will also fail easily.

SUMMARY

An object of the invention is to provide a track-jump control device of a PUH. The PUH generates a light spot on an optical disc. The optical disc comprises a plurality of L/G tracks. Each land and groove comprises a plurality of sectors and being connected in an L/G switch point. Each sector comprises a header to indicate the location information of the sector. The track-jump control device determines track-jump timing of the PUH to jump from a current position in a current sector of a current land/groove (L/G) track to a destination position in a destination sector of a destination L/G track.

The track-jump control device comprises an L/G position indicator, a header alignment controller, and a jump controller. The L/G position indicator calculates an amount of sectors between the current position and an upcoming L/G switch point to generate a distance value. The header alignment controller controls the destination position locating in a safe area between two headers, and then generating a jump enabling signal. The jump controller coupled to the L/G position indicator and the header alignment controller determines track-jump timing according to the distance value and the jump enabling signal.

Another object of the invention is to provide an L/G position indicator and a jump controller. The L/G position indicator calculates an amount of sectors between the current position and an upcoming L/G switch point to generate a distance value. The jump controller coupled to the L/G position indicator determines track-jump timing according to the distance value. The L/G position indicator further comprises an address decoder and a calculation unit. The address decoder receives and decodes addresses from a radio frequency (RF) signal and a header signal to generate decoded addresses. The calculation unit coupled to the address decoder calculates the distance value according to the decoded addresses.

A further object of the invention is to provide a header alignment controller and a jump controller. The header edge detector controls the header of current position aligning to an aligning header in the destination track, and detecting a delay value for the destination position in the safe area. The timing control unit coupled to the header edge detector generates the jump enabling signal after delaying a predetermined delay time N according to the delay value The header alignment controller further comprises a header edge detector and a timing control unit. The header edge detector controls the header of current position aligning to an aligning header in the destination track, and detects a delay value for the destination position in the safe area. The timing control unit coupled to the header edge detector generates the jump enabling signal after delaying a predetermined delay time N according to the delay value.

A further object of the invention is to provide a track-jump control method applied in a track-jump control device of a PUH. The method comprises: calculating an amount of sectors between the current position and an upcoming L/G switch point to generate a distance value; controlling the destination position locating in a safe area between two headers, and then generating a jump enabling signal; and determining track-jump timing according to the distance value and the jump enabling signal.

A further object of the invention is to provide a track-jump control method applied in a track-jump control device of a PUH. The method comprises: calculating an amount of sectors between the current position and an upcoming L/G switch point to generate a distance value; and determining track-jump timing according to the distance value. The step of calculating the amount of sectors further comprises: receiving and decoding addresses from a radio frequency (RF) signal and a header signal to generate decoded addresses; and calculating the distance value according to the decoded addresses.

Yet another object is to provide a track-jump control method applied in a track-jump control device of a PUH. The method comprises: controlling the destination position locating in a safe area between two headers, and then generating a jump enabling signal; and determining track-jump timing according to the jump enabling signal. The step of controlling the destination position further comprises: controlling the header of current position aligning to an aligning header in the destination track, and detecting a delay value for the destination position in the safe area; and generating the jump enabling signal after delaying a predetermined delay time N according to the delay value.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION

Figure 1:
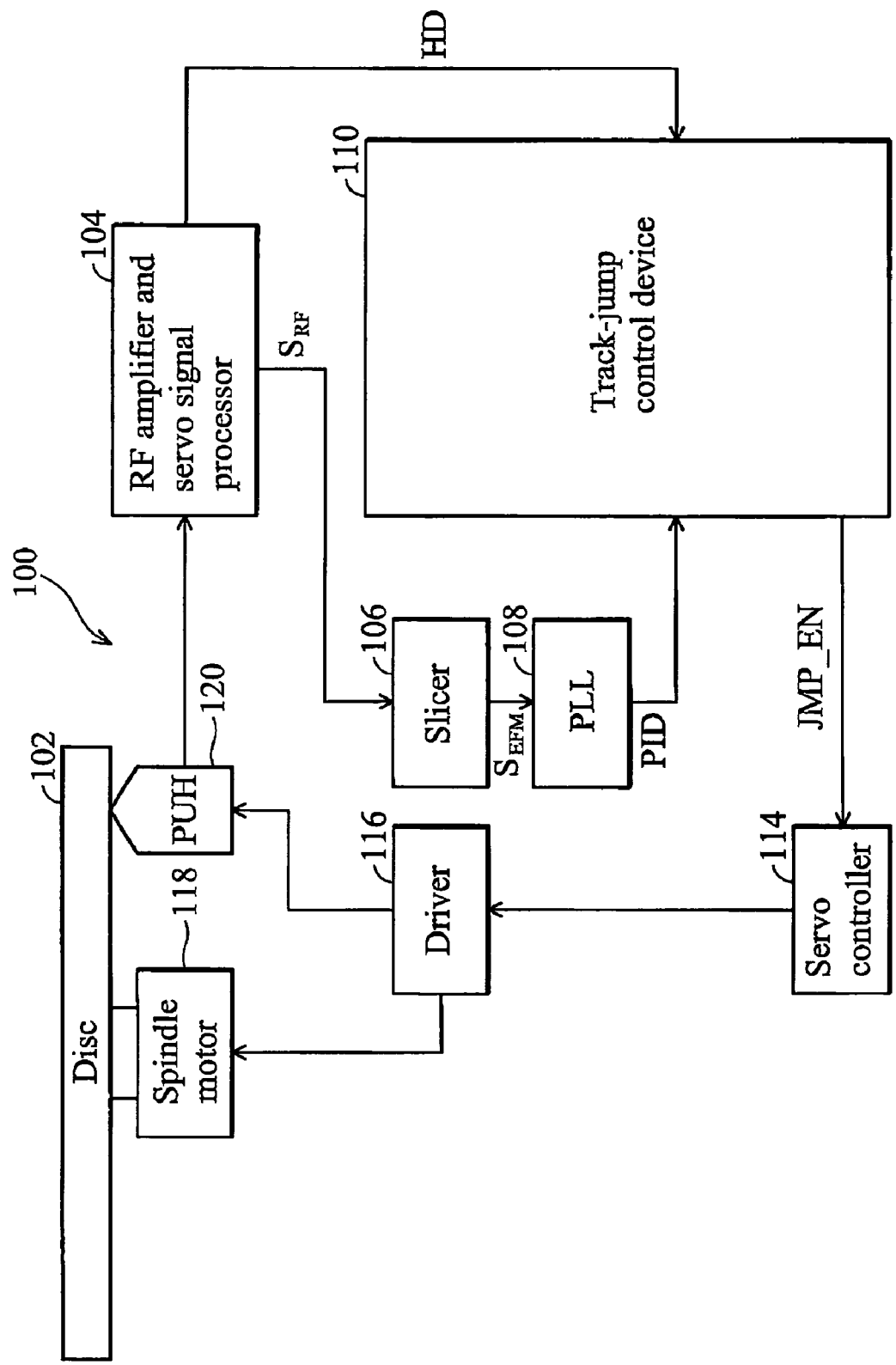
FIG. 1 is a block diagram of a disc drive according to an embodiment of the invention.

A detailed description of the invention is provided in the following. Please refer to FIG. 1. FIG. 1 is a block diagram of an optical disc drive 100 according to an embodiment of the invention. The optical disc drive 100 comprises a disc 102, a RF amplifier and servo signal processor 104, a slicer 106, a phase locked loop (PLL) 108, a track-jump control device 110, a servo controller 114, a driver 116, a spindle motor 118, and a pick-up head (PUH) 120. The disc 102 is a re-writable recording media, e.g. a DVD-RAM disc. The disc 102 comprises a plurality of L/G tracks. Each land and groove comprises a plurality of sectors and being connected in an L/G switch point. Each sector comprises a header to indicate the location information of the sector. The RF amplifier and servo signal processor 104 processes signals from the PUH 120 to generate a radio frequency (RF) signal $S_{RF}$ and a header signal HD. The slicer 106 generates an Eight-to-Fourteen Modulation (EFM) signal SEFM according to the RF signal $S_{RF}$, and then the PLL 108 generates a PID information according to the EFM signal $S_{EFM}$. The track-jump control device 110 determines track-jump timing and outputs a jump enabling signal JMP_EN to enable the track-jump according to the PID information and the header signal HD. The track-jump is from a current position in a current sector of a current land/groove (L/G) track to a destination position in a destination sector of a destination L/G track. The detailed description of other elements in the optical disc drive 100 is omitted since the functionally and operation are known to those skilled in the art. Further discussion about the track-jump device of the invention is detailed in the following.

Figure 2:
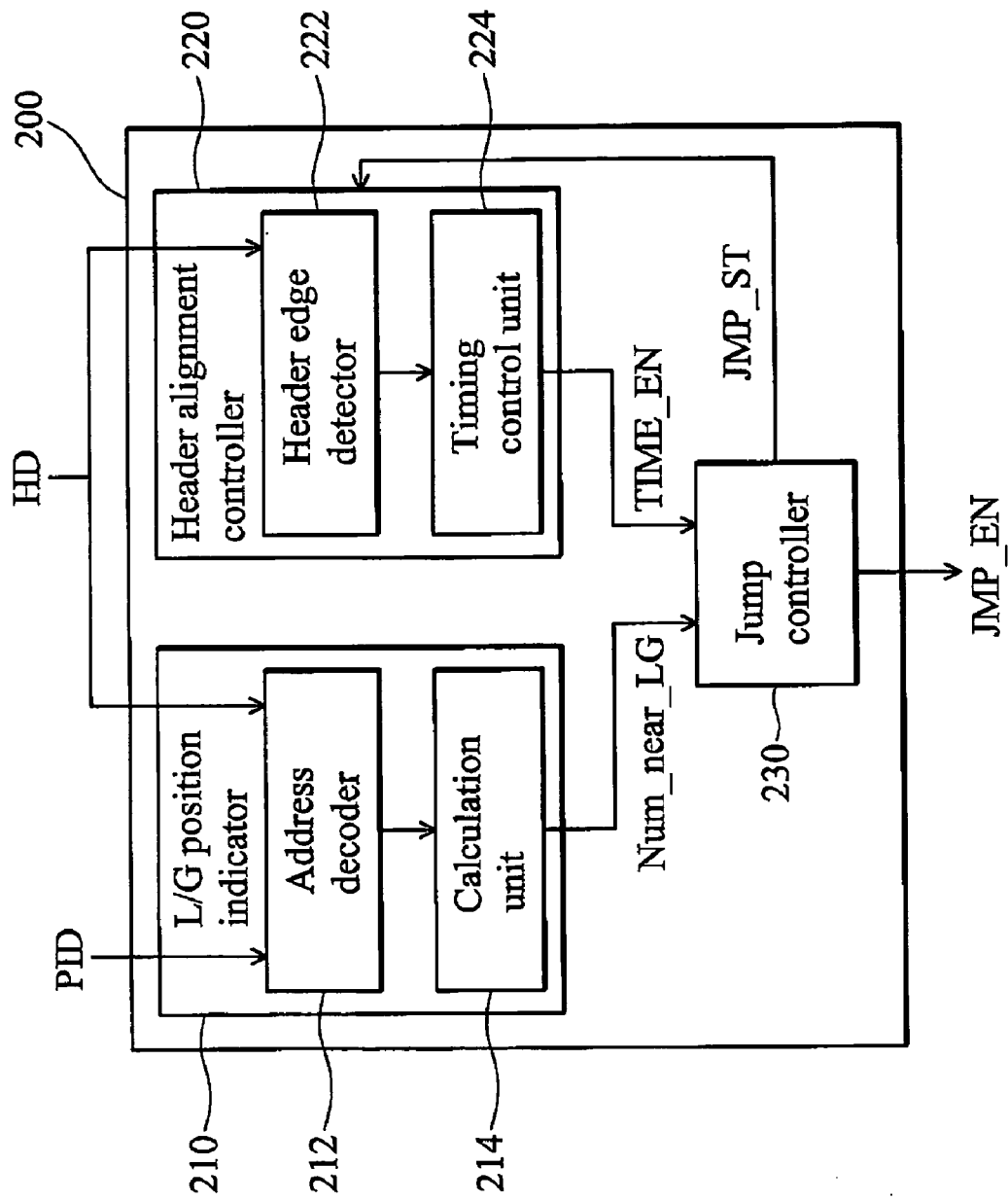
FIG. 2 is a block diagram of a track-jump control device in the disc drive according to an embodiment of the invention.
Figure 3:
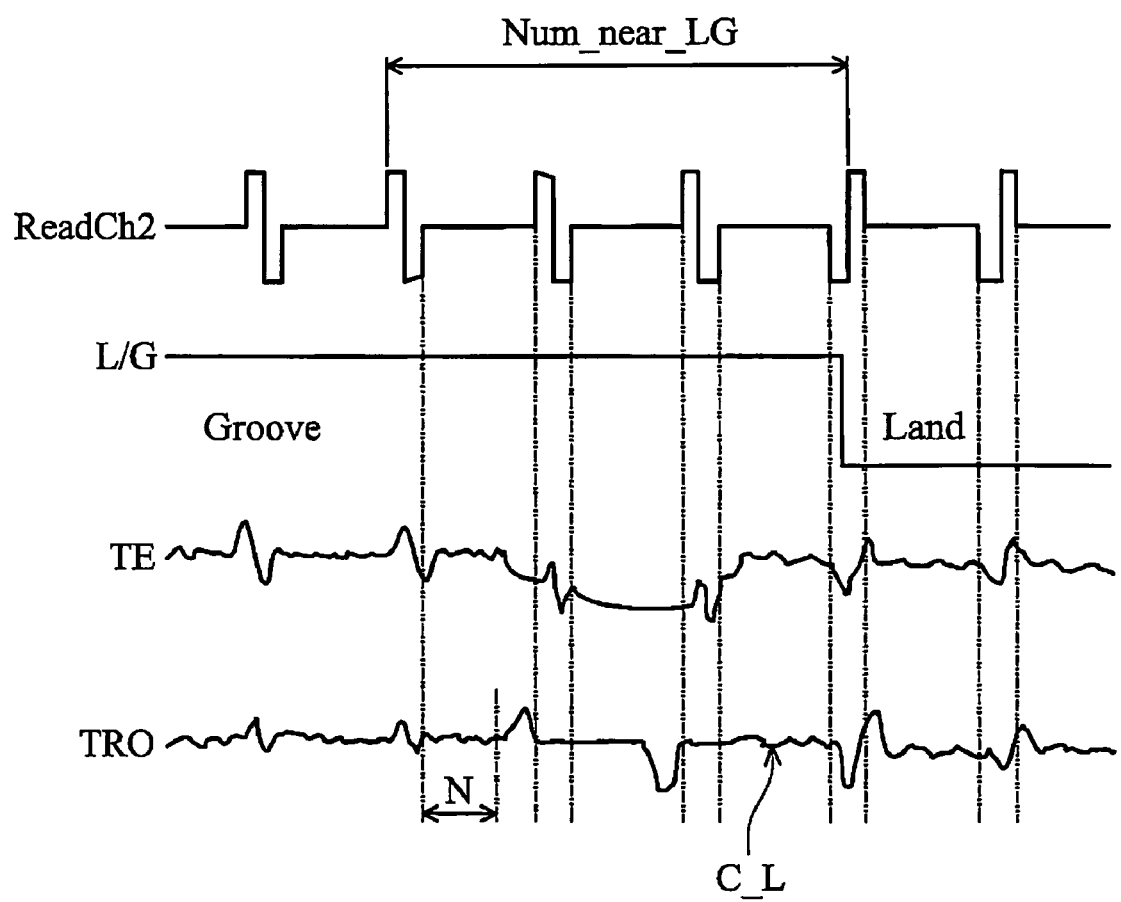
FIG. 3 shows the timing relationship of a Push-Pull signal ReadCh2, a land/groove switch signal L/G, a tracking error TE, and a tracking error output signal TRO in the optical disc drive.

Please refer to FIG. 2 and FIG. 3 at the same time. FIG. 2 is a block diagram of a track-jump control device 200 in the disc drive 100 according to an embodiment of the invention. FIG. 3 shows the timing relationship of a Push-Pull signal ReadCh2, a land/groove switch signal L/G, a tracking error TE, and a tracking error output signal TRO (not shown) in the optical disc drive 100. The track-jump control device 200 comprises an L/G position indicator 210, a header alignment controller 220, and a jump controller (e.g. a micro-processor) 230. In the beginning, the jump controller 230 sends a request signal JMP_ST for track-jumping. The L/G position indicator 210 calculates an amount of sectors between the current position and an upcoming L/G switch point to generate a distance value Num_near_LG (see FIG. 3). The header alignment controller 220 controls the destination position locating in a safe area between two headers, and then generates a timing enabling signal TIME_EN. The safe area could be the middle area between the two adjacent headers or could be a offset apart from the destination header, etc. The jump controller 230 finally determines track-jump timing according to the distance value Num_near_LG and the timing enabling signal TIME_EN to output a jump enabling signal JMP_EN.

Detailed description of determining track-jump timing will be discussed later. The operation and functionality of the L/G position indicator 210 and the header alignment controller 220 is described in the following.

The L/G position indicator 210 further comprises an address decoder 212 and a calculation unit 214. The address decoder 212 receives and decodes addresses from the RF signal $S_{RF}$ and a header signal HD to generate decoded addresses. The header signal HD comprises the address information which can be decoded and analyzed to get the distance far from the upcoming L/G switch point. In this embodiment, The header information is decoded from the current header in the current track. In other embodiments, the header information can be decoded from the destination header in destination track. The calculation unit 214 coupled to the address decoder 212 calculates the distance value Num_near_LG according to the decoded addresses.

The header alignment controller 220 further comprises a header edge detector 222 and a timing control unit 224. The header edge detector 222 controls the header of current position aligning to an aligning header in the destination track, and detects a delay value for the destination position in the safe area. The timing control unit 224 generates the timing enabling signal TIME_EN after delaying a predetermined delay time N according to the delay value. The predetermined delay time N is designed to ensure that the track-jump is finished in the middle of two headers of two adjoining sectors in the destination L/G track after jumping. For example, at a specific transfer rate, if the optical disc drive 100 needs 93 us to pass a sector and needs 240 us to accomplish the track-jump, a pass-header jump timing should be set at the 85.5 us after the PUH pass the current header of the current sector, or can be set at the 7.5 us before the current header. When the header edge detector 222 gets the pass-header jumping timing and the current position, the header edge detector 222 can easily get the header delay value. For another example, at another specific transfer rate, if the optical disc drive 100 needs 190 us to pass a sector and needs 240us to accomplish the track-jump, a pass-header jump timing should be set at the 45 us after the PUH pass the current header of the current sector, or can be set at the 140 us before the current header. Detailed description of determining track-jump timing is discussed in the following.

The jump controller 230 determines track-jumping if the distance value Num_near_LG is larger than a predetermined threshold value J plus K and a delay value is achieve at the same time. J represents an amount of sectors being crossed during track-jumping, and K represents a predetermined safe value. For example, at a specific transfer rate, J is equal to 3

$$\left(\left\lfloor \frac{240}{93} \right\rfloor\right)$$

if the optical disc drive 100 needs 93 us to read a sector and needs 240 us to finish the track-jump. And K is predetermined as 3, so the predetermined threshold values is 6 (J+K=3+3=6). That means the distance value decode from the current header must lager than 6, and the jump controller 230 could generate a jump start signal JMP_ST to the header alignment controller 220 to get a timing enabling signal TIME_EN.

Figure 4:
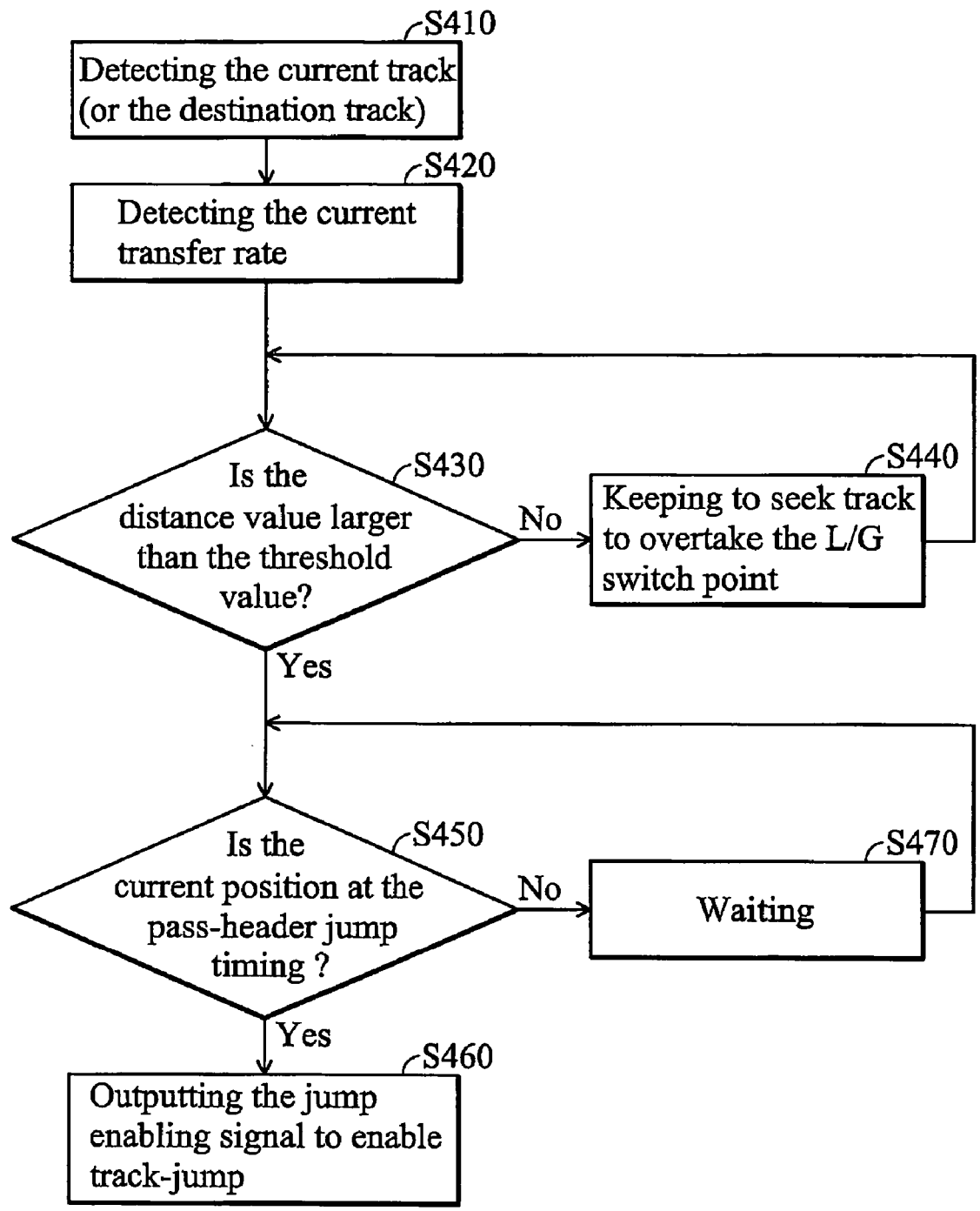
FIG. 4 is a flowchart illustrating a method for determining track-jump timing in the optical disc drive according to the invention.

Please refer to FIG. 4 in conjunction with FIG. 2 and FIG. 3. FIG. 4 is a flowchart illustrating a method for determining track-jump timing in the optical disc drive 100 according to the invention. The track-jump control device 200 detects the current track (or the destination track) and the current transfer rate to calculate the threshold value J plus K, the distance value Num_near_LG, and the delay time N (step S410 and step S420). The jump controller 230 then determines whether the distance value Num_near_LG is greater than the threshold value J plus K (step S430). If the distance value Num_near_LG is greater than the threshold value J plus K, the jump controller 230 goes to step S450. Otherwise the track-jump control device 500 keeps seeking a track to overtake the L/G switch point (step S440). The timing control unit 224 generates the timing enabling signal TIME_EN when the destination position could be located in the safe area between the adjacent two headers. (step S450 and S460). Otherwise, the timing control unit 224 keeps delaying (step S470).

Figure 5:
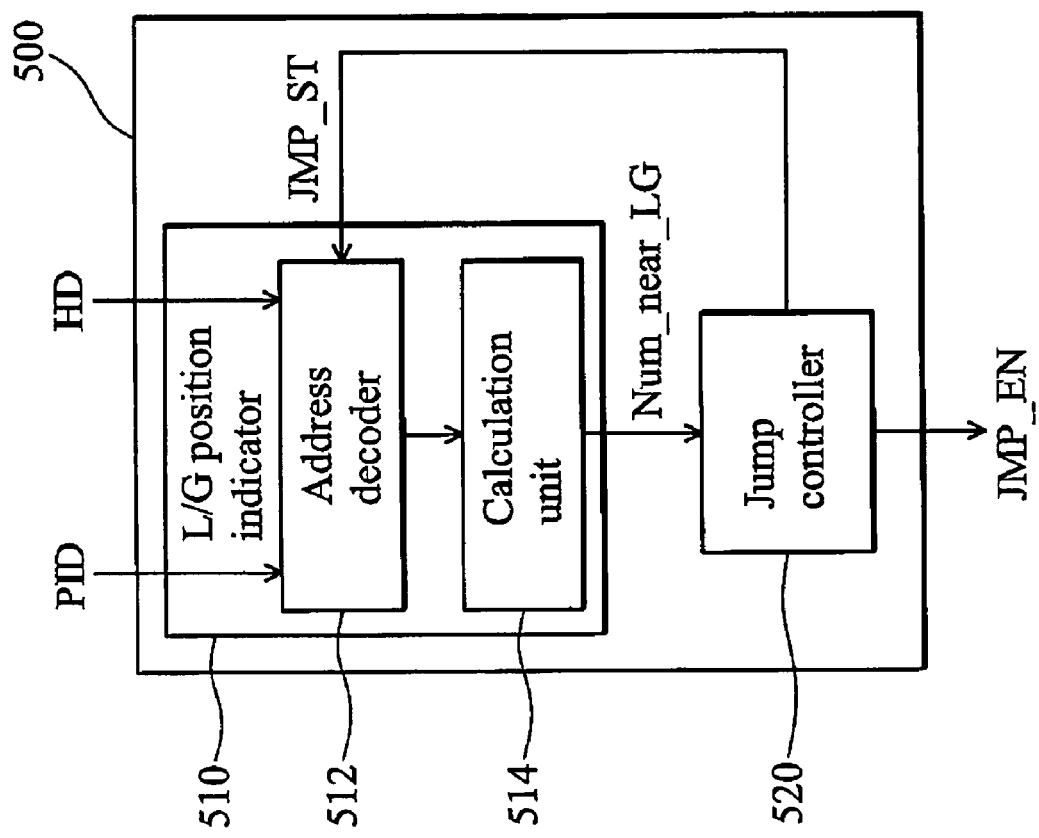
FIG. 5 is a block diagram of a track-jump control device in the disc drive 100 according to another embodiment of the invention.
Figure 6:
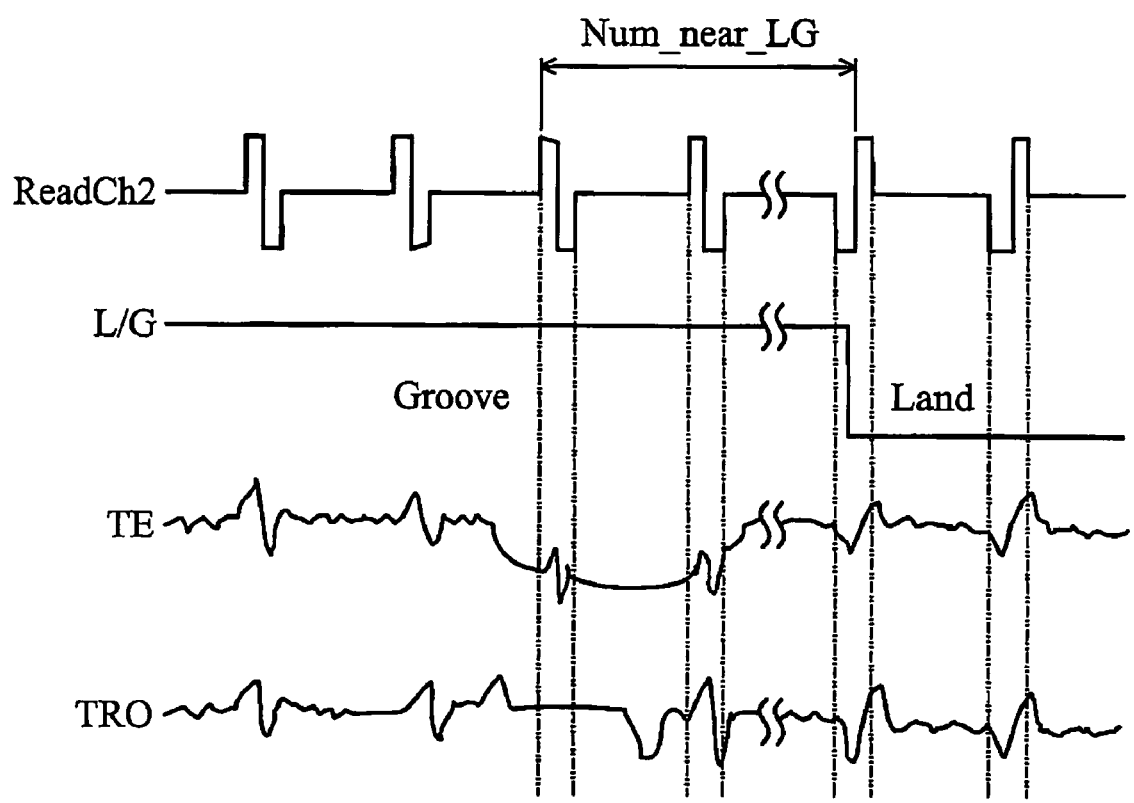
FIG. 6 shows the timing relationship of a Push-Pull signal ReadCh2, a land/groove switch signal L/G, a tracking error TE, and a tracking error output signal TRO in the optical disc drive.

Please refer to FIG. 5 and FIG. 6 at the same time. FIG. 2 is a block diagram of a track-jump control device 500 in the disc drive 100 according to another embodiment of the invention. FIG. 6 shows the timing relationship of a Push-Pull signal ReadCh2, a land/groove switch signal L/G, a tracking error TE, and a tracking error output signal TRO (not shown) in the optical disc drive 100. The track-jump control device 500 comprises an L/G position indicator 510, and a jump controller (e.g. a micro-processor) 520. In the beginning, the jump controller 520 sends a request signal JMP_ST for track-jumping. The L/G position indicator 510 calculates an amount of sectors between the current position and an upcoming L/G switch point to generate a distance value Num_near_LG (see FIG. 6). Detailed description of the operation and functionality about the L/G position indicator 510 is omitted for the sake of brevity since it is mentioned in the previous embodiment. The jump controller 520 finally determines track-jump timing if the distance value Num_near_LG is larger than a predetermined threshold value J plus K.

Figure 7:
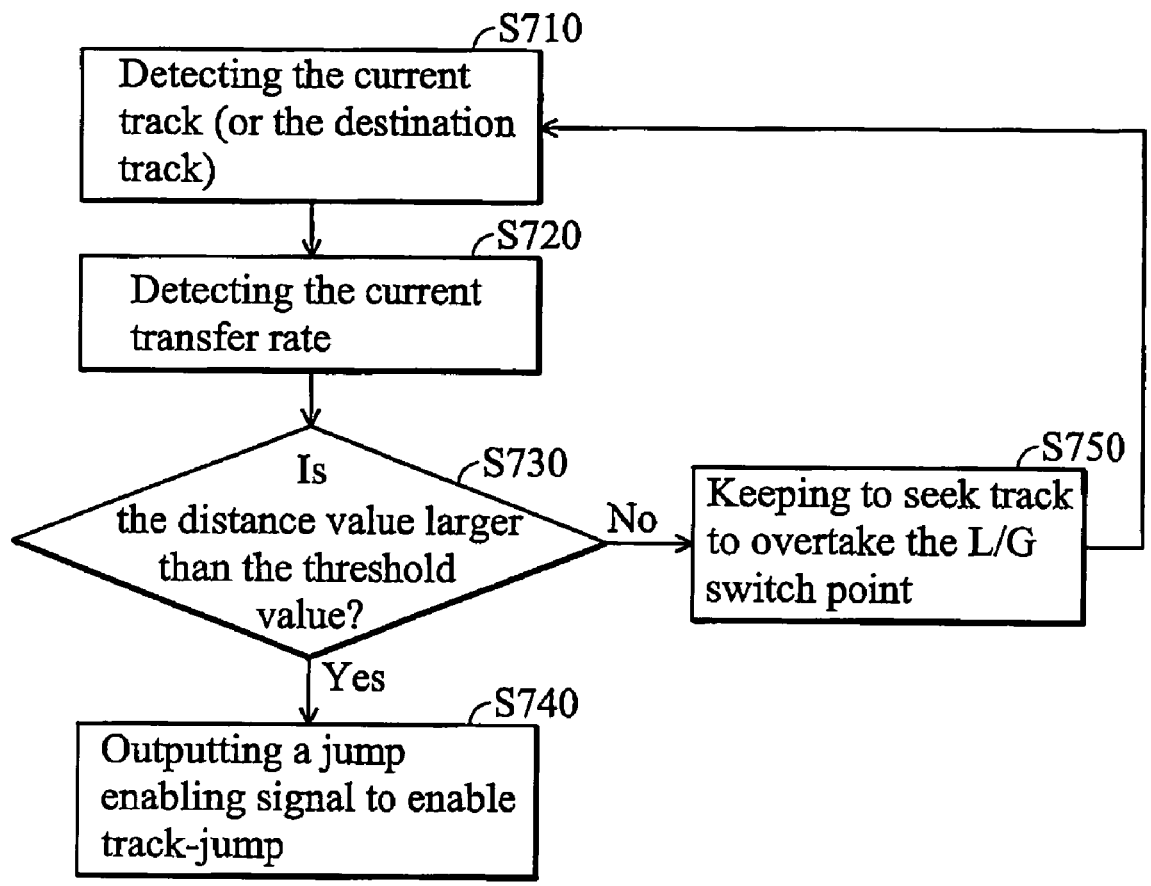
FIG. 7 is a flowchart illustrating another method for determining track-jump timing in the optical disc drive according to the invention.
Figure 8:
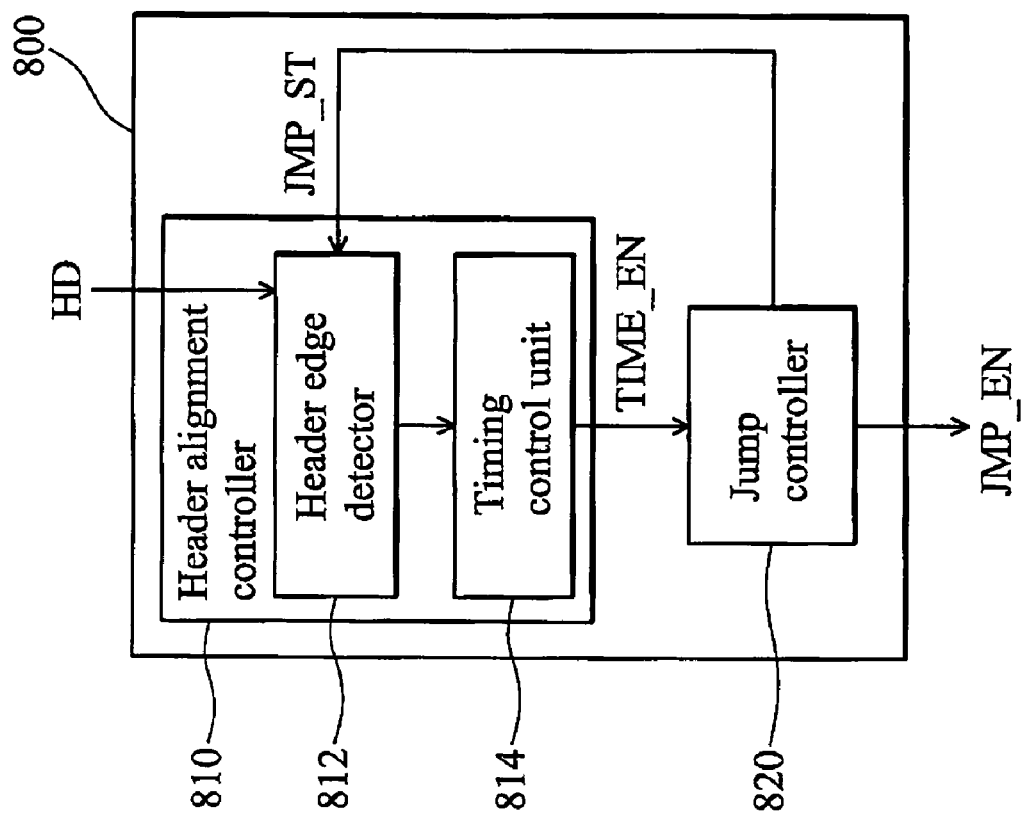
FIG. 8 is a block diagram of another track-jump control device in the disc drive according to an embodiment of the invention.
Figure 9:
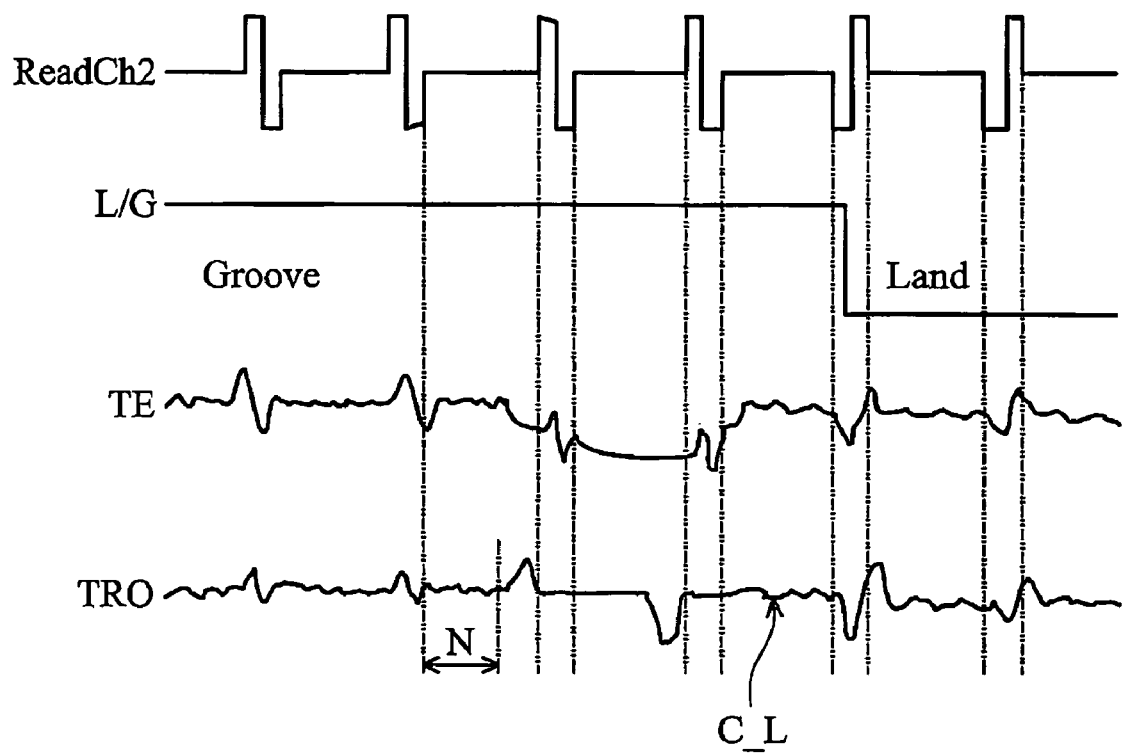
FIG. 9 shows the timing relationship of a Push-Pull signal ReadCh2, a land/groove switch signal L/G, a tracking error TE, and a tracking error output signal TRO in the optical disc drive.

Please refer to FIG. 7 in conjunction with FIG. 5 and FIG. 6. FIG. 7 is a flowchart illustrating a method for determining track-jump timing in the optical disc drive 100 according to the invention. The track-jump control device 500 detects the current track (or the destination track) and the current transfer rate to calculate the threshold value J plus K and the distance value Num_near_LG (step S710 and step S720). The controller 520 then determines whether the distance value Num_near_LG is greater than the threshold value J plus K (step S730). If the distance value Num_near_LG is greater than the threshold value J plus K, the controller 520 outputs a jump enabling signal JMP_EN to enable the track-jump (step S740). Otherwise the track-jump control device 200 keeps seeking a track to overtake the L/G switch point (Step S750). Please refer to FIG. 8 and FIG. 9 at the same time. FIG. 8 is a block diagram of a track-jump control device 800 in the disc drive 100 according to another embodiment of the invention. FIG. 9 shows the timing relationship of a Push-Pull signal ReadCh2, a land/groove switch signal L/G, a tracking error TE, and a tracking error output signal TRO (not shown) in the optical disc drive 100. The track-jump control device 800 comprises a header alignment controller 810, and a jump controller (e.g. a micro-processor) 820. In the beginning, the jump controller 820 sends a request signal JMP_ST for track-jumping. The header alignment controller 810 controls the destination position locating in a safe area (e.g. a point C_L in FIG. 9) between two headers, and then generates a timing enabling signal TIME_EN. Detailed description of the operation and functionality about the header alignment controller 810 is omitted for the sake of brevity since it is mentioned in the previous embodiment. The jump controller 820 determines track-jumping to output a jump enabling signal JMP_EN after receiving the timing enabling signal TIME_EN.

Figure 10:
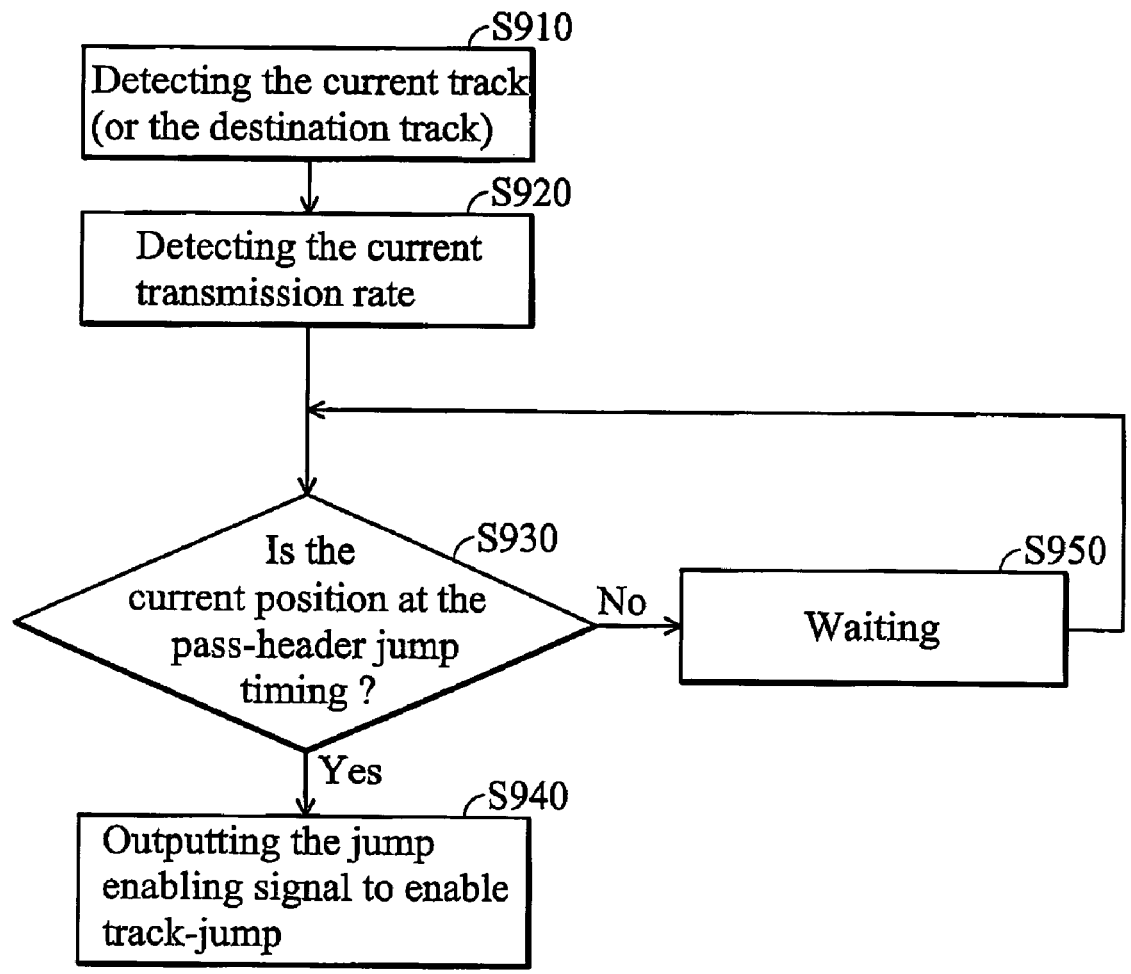
FIG. 10 is a flowchart illustrating another method for determining track-jump timing in the optical disc drive according to the invention.

Please refer to FIG. 10 in conjunction with FIG. 8 and FIG. 9. FIG. 10 is a flowchart illustrating another method for determining track-jump timing in the optical disc drive 100 according to the invention. The track-jump control device 800 detects the current track (or the destination track) and the current transfer rate to calculate the delay time N (step S910 and step S920). The timing control unit 814 generates the timing enabling signal TIME_EN when the destination position could be located in the safe area between the adjacent two headers. (step S930 and S940). Otherwise, the timing control unit 814 keeps delaying (step S950).

Compared with the related art, the track-jump control device according to the invention can prevent to encounter a header in a sector during a closed loop process of track-jump or to avoid encountering a polar transition in lands and grooves during a track-jump, thus increasing the rate of successful track-jumps. Additionally, please note that the number of tracks of a track-jump equal to 1 in the previous description is not taken to be a limitation. The number of tracks can be any positive value.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A track-jump control device of a PUH, said PUH generating a light spot on a optical disc, said optical disc comprising a plurality of L/G tracks, and each land and groove comprising a plurality of sectors and being connected in an L/G switch point, each sector comprising a header to indicate the location information of the sector, said track-jump control device determining track-jump timing of the PUH to jump from a current position in a current sector of a current land/groove (L/G) track to a destination position in a destination sector of a destination L/G track, comprising:
    an L/G position indicator for calculating an amount of sectors between the current position and an upcoming L/G switch point to generate a distance value;
    a header alignment controller for controlling the destination position locating in a safe area between two headers, and then generating a jump enabling signal; and
    a jump controller coupled to the L/G position indicator and the header alignment controller for determining track-jump timing according to the distance value and the jump enabling signal.

2. The track-jump control device according to claim 1, wherein the controller determines track-jumping if the distance value is larger than a predetermined threshold value and a delay value is achieve at the same time.

3. The track-jump control device according to claim 2, wherein the predetermined threshold value is equal to J plus K, wherein J represents an amount of sectors being crossed during track-jumping, and K represents a predetermined safe value.

4. The track-jump control device according to claim 1, wherein the L/G position indicator further comprises:
    an address decoder for receiving and decoding addresses from a radio frequency (RF) signal and a header signal to generate decoded addresses; and
    a calculation unit coupled to the address decoder for calculating the distance value according to the decoded addresses.

5. The track-jump control device according to claim 1, wherein the header alignment controller further comprises:
- a header edge detector for controlling the header of current position aligning to an aligning header in the destination track, and detecting a delay value for the destination position in the safe area; and
- a timing control unit coupled to the header edge detector for generating the jump enabling signal after delaying a predetermined delay time N according to the delay value.

6. The track-jump control device according to claim 5, wherein the predetermined delay time N is designed to ensure that the track-jump is finished in the middle of two headers of two adjoining sectors in the destination L/G track after jumping.

7. The track-jump control device according to claim 1, wherein the jump controller further sends a track-jump request signal to the header alignment controller to ask for track-jumping.

8. A track-jump control device of a PUH, said PUH generating a light spot on a optical disc, said optical disc comprising a plurality of L/G tracks, and each land and groove comprising a plurality of sectors and being connected in an L/G switch point, each sector comprising a header to indicate the location information of the sector, said track-jump control device determining track-jump timing of the PUH to jump from a current position in a current sector of a current land/groove (L/G) track to a destination position in a destination sector of a destination L/G track, comprising:
- an L/G position indicator for calculating an amount of sectors between the current position and an upcoming L/G switch point to generate a distance value; and
- a jump controller coupled to the L/G position indicator for determining track-jump timing according to the distance value.

9. The track-jump control device according to claim 8, wherein the controller determines track-jumping if the distance value is larger than a predetermined threshold value.

10. The track-jump control device according to claim 9, wherein the predetermined threshold value is equal to J plus K, wherein J represents an amount of sectors being crossed during track-jumping, and K represents a predetermined safe value.

11. The track-jump control device according to claim 8, wherein the L/G position indicator further comprises:
- an address decoder for receiving and decoding addresses from a radio frequency (RF) signal and a header signal to generate decoded addresses; and
- a calculation unit coupled to the address decoder for calculating the distance value according to the decoded addresses.

12. The track-jump control device according to claim 8, wherein the jump controller further sends a track-jump request signal to the header alignment controller to ask for track-jumping.

13. A track-jump control device of a PUH, said PUH generating a light spot on a optical disc, said optical disc comprising a plurality of L/G tracks, and each land and groove comprising a plurality of sectors and being connected in an L/G switch point, each sector comprising a header to indicate the location information of the sector, said track-jump control device determining track-jump timing of the PUH to jump from a current position in a current sector of a current land/groove (L/G) track to a destination position in a destination sector of a destination L/G track, comprising:
- a header alignment controller for controlling the destination position locating in a safe area between two headers, and then generating a jump enabling signal; and
- a jump controller coupled to the header alignment controller for determining track-jump timing according to the jump enabling signal.

14. The track-jump control device according to claim 13, wherein the header alignment controller further comprises:
- a header edge detector for controlling the header of current position aligning to an aligning header in the destination track, and detecting a delay value for the destination position in the safe area; and
- a timing control unit coupled to the header edge detector for generating the jump enabling signal after delaying a predetermined delay time N according to the delay value.

15. The track-jump control device according to claim 14, wherein the predetermined delay time N is designed to ensure that the track-jump is finished in the middle of two headers of two adjoining sectors in the destination L/G track after jumping.

16. The track-jump control device according to claim 13, wherein the jump controller further sends a track-jump request signal to the header alignment controller to ask for track-jumping.

17. A track-jump control method applied in a track-jump control device of a PUH, said PUH generating a light spot on a optical disc, said optical disc comprising a plurality of L/G tracks, and each land and groove comprising a plurality of sectors and being connected in an L/G switch point, each sector comprising a header to indicate the location information of the sector, said track-jump control device determining track-jump timing of the PUH to jump from a current position in a current sector of a current land/groove (L/G) track to a destination position in a destination sector of a destination L/G track, comprising:
- calculating an amount of sectors between the current position and an upcoming L/G switch point to generate a distance value;
- controlling the destination position locating in a safe area between two headers, and then generating a jump enabling signal; and
- determining track-jump timing according to the distance value and the jump enabling signal.

18. The track-jump control method according to claim 17, wherein the determining step determines track-jumping if the distance value is larger than a predetermined threshold value and a delay value is achieve at the same time.

19. The track-jump control method according to claim 18, wherein the predetermined threshold value is equal to J plus K, wherein J represents an amount of sectors being crossed during track-jumping, and K represents a predetermined safe value.

20. The track-jump control method according to claim 17, wherein the step of calculating the amount of sectors further comprises:
- receiving and decoding addresses from a radio frequency (RF) signal and a header signal to generate decoded addresses; and
- calculating the distance value according to the decoded addresses.

21. The track-jump control method according to claim 17, wherein the step of controlling the destination position further comprises:

controlling the header of current position aligning to an aligning header in the destination track, and detecting a delay value for the destination position in the safe area; and generating the jump enabling signal after delaying a predetermined delay time N according to the delay value.

22. The track-jump control method according to claim 21 wherein the predetermined delay time N is designed to ensure that the track-jump is finished in the middle of two headers of two adjoining sectors in the destination L/G track after jumping.

23. The track-jump control method according to claim 17, wherein a track-jump request signal is sent for track-jumping.

24. A track-jump control method applied in a track-jump control device of a PUH, said PUH generating a light spot on a optical disc, said optical disc comprising a plurality of L/G tracks, and each land and groove comprising a plurality of sectors and being connected in an L/G switch point, each sector comprising a header to indicate the location information of the sector, said track-jump control device determining track-jump timing of the PUH to jump from a current position in a current sector of a current land/groove (L/G) track to a destination position in a destination sector of a destination L/G track, comprising:

calculating an amount of sectors between the current position and an upcoming L/G switch point to generate a distance value; and determining track-jump timing according to the distance value.

25. The track-jump control method according to claim 24, wherein track-jump is determined if the distance value is larger than a predetermined threshold value.

26. The track-jump control method according to claim 25, wherein the predetermined threshold value is equal to J plus K, wherein J represents an amount of sectors being crossed during track-jumping, and K represents a predetermined safe value.

27. The track-jump control method according to claim 24, wherein the step of calculating the amount of sectors further comprises:

receiving and decoding addresses from a radio frequency (RF) signal and a header signal to generate decoded addresses; and calculating the distance value according to the decoded addresses.

28. The track-jump control method according to claim 24, wherein a track-jump request signal is sent to ask for track-jumping.

29. A track-jump control method applied in a track-jump control device of a PUH, said PUH generating a light spot on a optical disc, said optical disc comprising a plurality of L/G tracks, and each land and groove comprising a plurality of sectors and being connected in an L/G switch point, each sector comprising a header to indicate the location information of the sector, said track-jump control device determining track-jump timing of the PUH to jump from a current position in a current sector of a current land/groove (L/G) track to a destination position in a destination sector of a destination L/G track, comprising:

controlling the destination position locating in a safe area between two headers, and then generating a jump enabling signal; and determining track-jump timing according to the jump enabling signal.

30. The track-jump control method according to claim 29, wherein the step of controlling the destination position further comprises:

controlling the header of current position aligning to an aligning header in the destination track, and detecting a delay value for the destination position in the safe area; and generating the jump enabling signal after delaying a predetermined delay time N according to the delay value.

31. The track-jump control method according to claim 30, wherein the predetermined delay time N is designed to ensure that the track-jump is finished in the middle of two headers of two adjoining sectors in the destination L/G track after jumping.

32. The track-jump control method according to claim 29, wherein a track-jump request signal is sent to ask for track-jumping.

* * * * *